Nov. 28, 1961   H. R. GIFFORD   3,010,523
DEBRIS COLLECTOR
Filed Jan. 18, 1960

Fig. 1

Fig. 2

INVENTOR.
HARRY R. GIFFORD
BY
John M. Montstream
ATTORNEY

United States Patent Office 3,010,523
Patented Nov. 28, 1961

3,010,523
DEBRIS COLLECTOR
Harry R. Gifford, 2334 Rosendale Road,
Schenectady 9, N.Y.
Filed Jan. 18, 1960, Ser. No. 3,167
7 Claims. (Cl. 171—63)

The invention relates to a debris collector which is run over the ground such as an athletic field so that stones, bottle caps and the like are picked up in a collector or compartment. The device is run over the ground and debris projecting above ground is flipped or snapped upwardly and rearwardly so that it falls on a platform such as a relatively small mesh screen. The debris is in this manner for disposal.

It is an object of the invention to construct a debris collector which is run over the ground and debris is snapped onto an adjacent following platform or container.

Another object is as above but in addition includes tines somewhat in the nature of a rake or rakes which engage the ground ahead of the means for snapping the debris onto the platform which tines will dislodge debris embedded or partially embedded in the ground so that it is loosened or brought to the surface whereupon the snapping means flips such debris onto the platform or container.

Other objects of the invention will be more apparent from the following description when taken in connection with the accompanying drawings illustrating a preferred embodiment thereof in which:

FIG. 1 is a top view of the debris collector; and
FIG. 2 is a vertical section through the debris collector taken on line 2—2 of FIG. 1.

The debris collector includes a frame shown somewhat in the form of an open bottom box having side members 5 and secured together in spaced relation such as by suitable cross bars 6, 7 and 8. Ground contacting means shown as wheels including rear wheels 9, mounted exterior of the side members and at least one caster front wheel 10 mounted on the front cross bar 6. If desired, the wheels could be dispensed with and the bottom edges of the side members used as runners in the fashion of sled or drag runners. The frame also serves as a container and has a bottom 12 which preferably is a screen of about one quarter inch mesh. In other words, the particles of smaller size are not harmful to the surface of the field and may pass through the screen. Larger particles are collected on top of the screen. The screen may be removable and rests on flanges 19 carried by the side members adjacent to the ground. Weights W, which may be concrete blocks, are suitably mounted on the frame and the mounting means shown includes a cross board 11 having clamping means 14 comprising a clamping board and bolts.

The debris collector has resilient flipping or snapping means which resiliently presses the ground so that a piece of debris passing underneath is snapped or flipped into the air rearwardly onto the screen 12. The flipping or snapping means particularly shown includes plate means 15 extending across the frame between the side members 5 and preferably it is in a plurality of sections or plates, four being illustrated. A desirable construction is to provide a pivot in the form of a pivot bar 16 extending across the fame and secured in the in the side members 5. The plate means 15 are pivotally mounted on the pivot such as by securing the forward edge of each of the plate means to a bracket 17 and the bracket is pivotally mounted on the pivot bar. The upper portion of the plate extends at an angle of about 25° and the lower portion of the plate having its edge in contact with the ground is at a smaller angle with respect to the ground such as about 10°. So constructed the plate will pass over the debris. If the lower portion of the plate were flat with the ground or the angle of the upper portion were substantially less than 25°, the plate would tend to push the debris forward rather than pass beneath the plate. The angle of the lower portion also has some effect on the extent to which the debris is flipped or tossed rearwardly.

Separate spring means 18 are shown for pressing each plate into contact with the ground. The spring means 18 illustrated extends from the cross bar 8 to its plate 15. As applied this spring is a compression spring. The compression of the spring means may be made adjustable in any way, a simple form of adjustment being to insert or remove spacer blocks 20. Each plate 15 may carry a pin 21 to fix the end of the spring means thereto. A spring applying a pressure of about 35 to 45 pounds applied between the center of the plate and the grounded edge and with a plate having a width of about 12 inches provides sufficient pressure to give satisfactory debris flipping. In other words it approximates 3 to 4 pounds pressure per inch of plate edge in contact with the ground when passing over the ground at a speed of from 2 to 5 miles per hour for best action or jump response. For lower speeds the spring pressure should be increased for best action and for higher speeds the spring pressure should be decreased. In other words fast travel with the specified spring pressure would cause more violent or active flipping or jump response of the debris. The plate or flipping means may be inherently resilient and fixed to the mounting bar 16 in sprung position such as by a set screw 19, however, the separate spring means is preferred.

A piece of debris on the ground passing under the resilient plate means 15 is flipped or snapped upwardly and rearwardly, as it passes from beneath the edge of the plate means, and onto the screen 12. The distance with which such debris will be flipped depends upon the resiliency of the plate means in contact with the ground and speed of the collector. The forward edge 13 of the bottom or screen 12 should be distant enough from the end of the plate so that debris is snapped or flipped upwardly and rearwardly without interference from the screen and it must be near enough so that when snapped, it will fall on the screen. A suitable distance has been found to be about 7 inches for the spring pressures and speeds set forth herein.

Often times the debris has been partially or perhaps even entirely pressed into the surface of the ground so that it is flush therewith or protrudes somewhat. For this reason it is desirable to have loosening means ahead of the plate means 15. The loosening means particularly illustrated is tine means having tines or fingers 26 resiliently pressing the ground. Preferably the tine means is in sections of about 12 inches wide, four being shown extending between the side members of the frame and each section including six spaced tines. Separate spring means may be provided to press the ends of the tines resiliently against the ground. It may be desirable too that the spring pressure against the ground be adjustable. The construction shown includes a tine means or pivot bar 27 extending across from the side members 11 and secured thereto. A series of brackets 28 such as of channel form, are pivotally mounted on the pivot bar and each bracket carries fingers or tines 26 which are suitably secured to the bracket and spaced apart about 2 inches. As shown, holes are provided through the flanges of the channel bracket and an eye bolt 25 receives a tine and clamps the same in its hole in the bracket. The angle of the tines with respect to the ground is about 45° and satisfactory tines have been steel rods ⅝ inch in diameter.

Any spring means may be used such as inherent resiliency in the tines, however, a separate spring means 29 is shown between an anchor 30 carried by a cross bar and an extension 31 carried by the bracket 28. The plurality of tine sections shown enables the unloosening or dislodging means to conform more readily to variations in the surface area being cleaned. The spring means for the unloosening means is about 15 pounds for each tine section or about 2.5 pounds per tine with about a half tine lever arm and as applied this spring is a tension spring. This spring means also performs more satisfactorily at decreased pressure when speed of travel is increased and higher pressure at lower speeds. The spring pressure on the tines should not be too great in order to avoid unnecessary digging into the soil and turf.

The frame or debris collector should have sufficient weight so that the plate means and the tine means do not lift the collector off or partially off of the ground. In other words, the weight of the device must be such that it overcomes the resiliency of the spring means applied to the plate means and tine means tending to lift the device. If additional weight should be needed this could be accomplished by mounting additional concrete blocks on the frame. An efficient location for weight and any additional weight is over the plate means and tine means or adjacent thereto.

Some debris may be flipped too high, particularly at higher speed or speeds above 5 miles per hour, hence it is desirable that the frame have a lid 35 over the bottom or screen in order to prevent high flying debris from being thrown too far. Such lid may be removably secured to the frame such as by screw and wing nuts 36. A rear board 37 may be provided, as well, and it is shown hingedly mounted on hinges 38 carried by the lid and secured in closed position such as by screw and wing nuts 39.

The collector may be drawn over the field by the cable 41.

This invention is presented to fill a need for improvements in a debris collector. It is understood that various modifications in structure, as well as changes in mode of operation, assembly, and manner of use, may and often do occur to those skilled in the art, especially after benefitting from the teachings of an invention. This disclosure illustrates the preferred means of embodying the invention in useful form.

What is claimed is:

1. A debris collector to run over the ground comprising a container having side members and ground contacting means and a bottom positioned to be adjacent to the ground, the bottom having a forward edge, resilient plate means mounted across the frame between the side members of the container and spaced in front of the forward edge of the bottom but adjacent thereto and positioned to press against the ground at a rearwardly directed angle of about 10 degrees with respect to the ground and with a tension to flip debris above the ground and onto the bottom of the container, the plate means exerting a pressure against the ground of approximately 3 to 4 pounds per inch of ground contact, and the collector having a weight to overcome the upward pressure of the plate means.

2. A debris collector as in claim 1 in which the plate means has an upper portion and a lower portion in which the upper portion is directed at an angle of about 25 degrees with respect to the ground.

3. A debris collector as in claim 1 including pivot means mounting the plate means and separate spring means engaging the plate means to resiliently press the edge thereof against the ground.

4. A debris collector as in claim 1 including resilient tine means carried by the frame forwardly of the plate means including a plurality of spaced tines positioned to press at a rearwardly directed angle of roughly 45° against the ground and with a tension to loosen embedded debris, the tension being approximately 2.5 pounds per tine, and the collector having a weight to overcome also the upward pressure of the tine means.

5. A debris collector as in claim 4 including pivot means mounting the tine means, and spring means carried by the container and engaging the tine means to resiliently press the ends thereof against the ground.

6. A debris collector as in claim 4 in which the tine means includes a channel shaped bracket pivotally mounted on the frame, and the tines being secured to the flanges of the channel.

7. A debris collector as in claim 1 including a cover secured to the frame above the bottom.

References Cited in the file of this patent
UNITED STATES PATENTS 300,173    Weatherbee _____ June 10, 1884